Feb. 23, 1965 L. T. FIKE 3,170,193
ELECTRIC HEATING UNIT FOR TIRE MATRICES
Filed Oct. 15, 1962 2 Sheets-Sheet 1
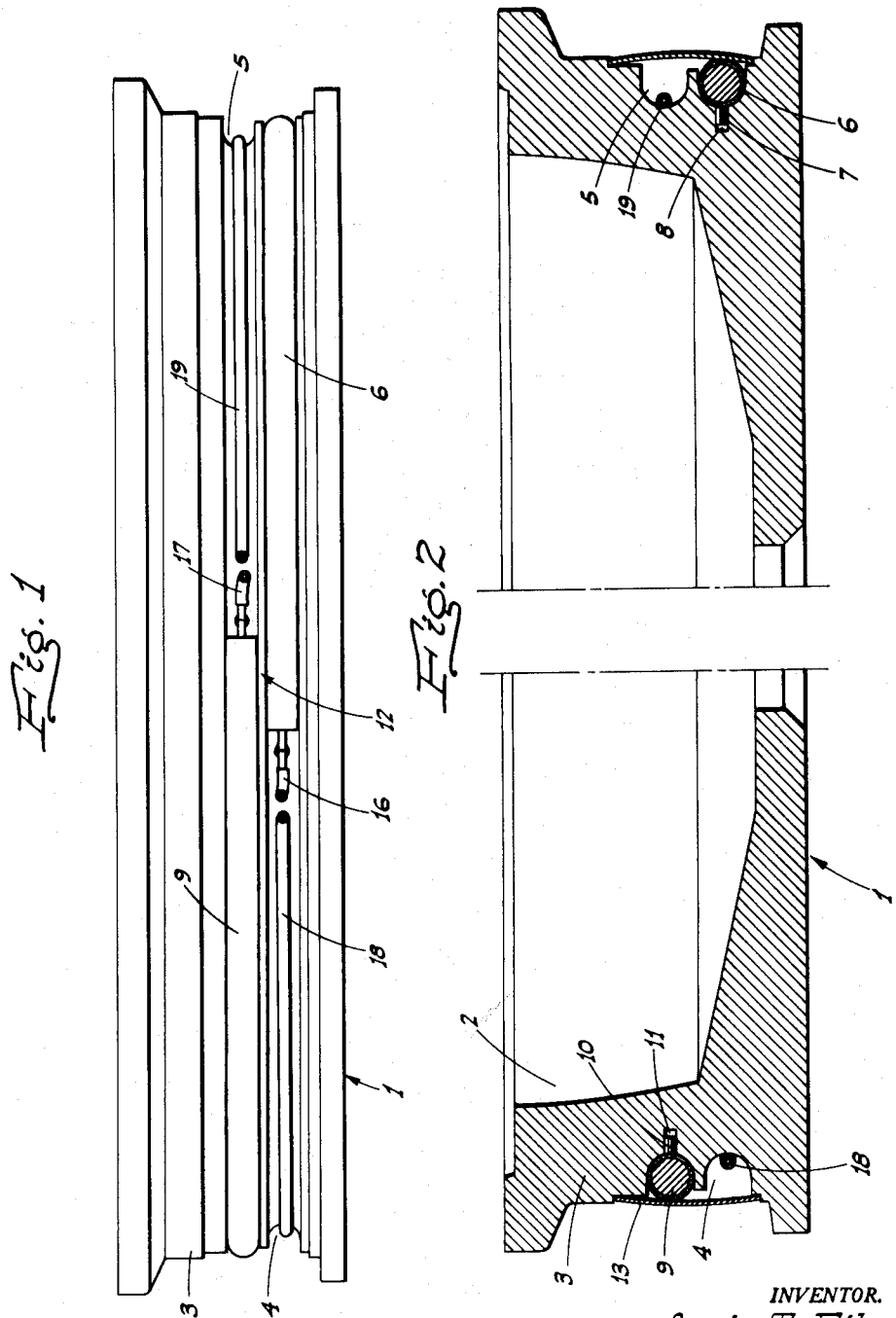
INVENTOR.
Louis T. Fike
BY
Webster & Webster
ATTYS.

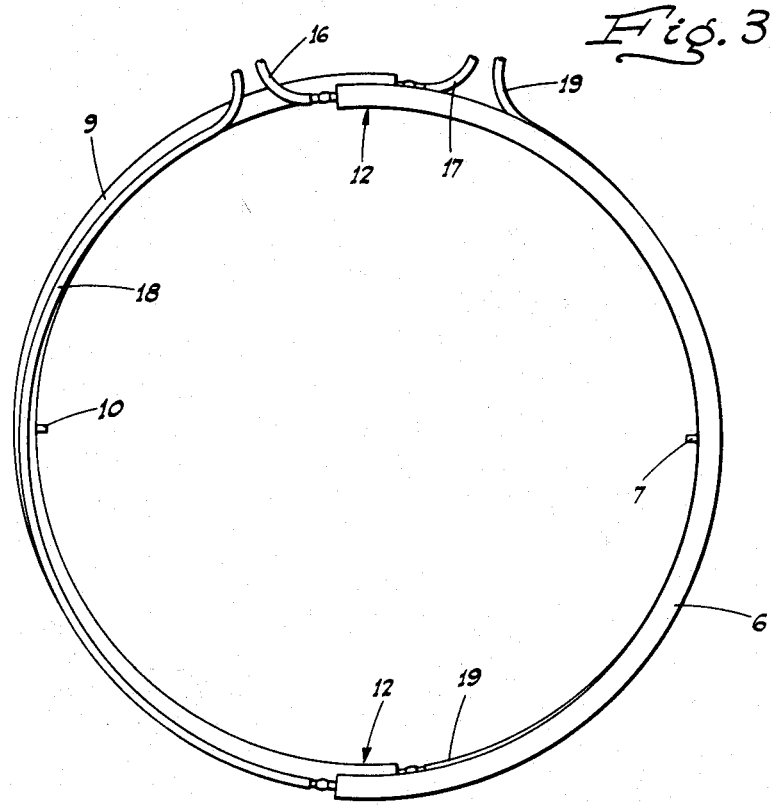
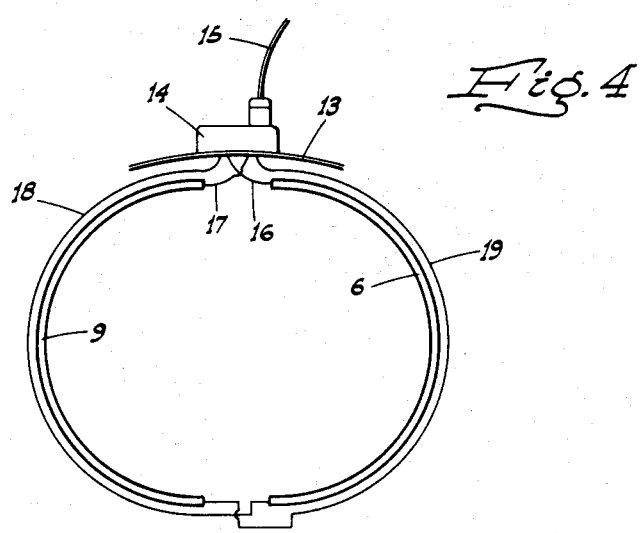

3,170,193
ELECTRIC HEATING UNIT FOR TIRE MATRICES
Louis T. Fike, Lodi, Calif., assignor to Super Mold Corporation of California, Lodi, Calif., a corporation of California
Filed Oct. 15, 1962, Ser. No. 230,378
5 Claims. (Cl. 18—38)

This invention relates to the tire making or retreading industry, and particularly to the heating of the matrices used in the treading or retreading operations, when using electrical heating means.

The matrices employed in tire retreading operations are in the form of full-circle or endless metal bodies, which have a certain rate of expansion when heated. The electric heating elements currently used are of a type which includes a rigid but expansible metal sheath which of necessity has a rate of expansion different from that of the matrix body, and have heretofore been made to engage the body in completely surrounding relation thereto. In operation this caused a movement of the elements with relation to the matrix body which often resulted in element failure because of a broken sheath, or shorted-out terminal connection wires.

It is therefore the principal object of this invention to provide heating elements which, while of the same type as noted above, are so formed and arranged on the matrix body that element failure due to the difference in expansion rates is positively eliminated. At the same time, the manufacturing and machine work on the matrix body is lessened and simplified over what has been previously the case, and the connection of the elements to the terminal box which is mounted on the matrix body has also been simplified.

A further object of the invention is to provide an electric heating unit for tire matrices which is designed for ease and economy of manufacture.

Still another object of the invention is to provide a practical, reliable, and durable electric heating unit for tire matrices, and one which will be exceedingly effective for the purpose for which it is designed.

These objects are accomplished by means of such structure and relative arrangement of parts as will fully appear by a persual of the following specification and claims.

In the drawings:

FIG. 1 is a side elevation of a matrix section, showing the separate heating elements as mounted thereon in cooperating relationship; the element-enclosing band being removed.

FIG. 2 is an enlarged diametral sectional elevation, foreshortened, of the matrix section and heating elements.

FIG. 3 is a plan view of the heating elements, detached from the matrix section, but disposed generally in the same cooperative relationship that they occupy when mounted in said section.

FIG. 4 is a diagram of the heating elements and the circuit wiring associated therewith.

Referring now more particularly to the drawings and to the characters of reference marked thereon, the matrix section here shown is half of the complete matrix, and is an endless circular body 1 formed with an internal annular chamber 2 shaped peripherally to follow the contour of the tread of a tire, and to form the desired tread design therein as usual; the chamber 2 being of course open to one side of the body 1 for matching engagement with the corresponding chamber in the other half of the matrix.

Formed in the peripheral portion 3 of the body 1, and extending circumferentially thereabout in somewhat closely associated relationship, are endless relatively deep identical and parallel grooves 4 and 5 which face outwardly of the body, and the bottom portions of which are of semi-circular form in cross section. Seated in the groove 4 is an electric heating element 6 of the tubular sheathed type, the length of which is such that it extends slightly more than half way about the circumferential extent of the groove. The diameter of the element 6 is such that it fits snugly in the groove, the depth of which is slightly less than such diameter.

In order to positively hold the element 6 in a certain position in the groove 4, and against circumferential movement along the same, a short dowel pin 7 is secured on the sheath of said element substantially midway of its length, and which pin projects from the concavely curved side of the element radially of the matrix portion 3; said pin seating in a socket 8 extending into such matrix portion from the bottom of the groove 4.

An identical heating element 9, the same length as the element 6, is seated in the groove 5 in opposed relation to the element 6, said element 9 also having a dowel or locating pin 10 secured thereon, and which seats in a socket 11 projecting radially into the matrix portion 3 from the bottom of said groove. The socket 11 is positioned directly opposite the socket 8, or so that the ends of the two elements 6 and 9, when seated in place, overlap each other in planes transversly of the matrix section, as shown at 12 in FIG. 1. This prevents any heat-gap being had in the matrix portion between the ends of the heating elements.

The heating elements are held in place, against escape from the respective grooves, by means of a removable band 13 which is mounted on the matrix portion 3 in surrounding and covering relation to the grooves 4 and 5 and the heating elements 6 and 9 therein, and engaging the radially outermost faces of said elements as shown in FIG. 2; a terminal and control box 14 (see FIG. 4) being mounted on said band at a point adjacent one of the overlapping ends 12 of the heating elements, and to which box a current-supply cable or cord 15 is detachably connected.

Short insulated cables 16 and 17 are connected to those ends of the elements 6 and 9 respectively which are closest to the control box, and extend to suitable terminals within the box 14. Other insulated cables 18 and 19 are connected to the opposite ends of the elements 6 and 9 respectively and extend along the unoccupied portions of the corresponding grooves 4 and 5 respectively, and then enter and are secured in the terminal box 14 in circuit-forming relation with the corresponding cables 16 and 17 respectively.

By reason of the relative shortness of the heating elements, and the offsetting thereof on the matrix body, the longitudinal expansion of each element is practically half that of a single full-length element, and—being offset from each other—the elements can expand lengthwise without interfering with each other.

Further, with the heating elements anchored against displacement by the dowel pins 7 and 10, and as the cables are relatively flexible, expansion (or contraction) of said elements can occur without damage to them or to said cables.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a tire receiving matrix which includes a full-circle body provided with a pair of circumferentially extending endless grooves in its outer periphery spaced axially of the matrix, a pair of separate heating elements seated in the grooves, each element extending substantially half way about the body, and the two elements being disposed in opposed relation to each other with their ends separated both circumferentially and axially of the matrix.

2. In a tire receiving matrix which includes a full-circle body provided with a pair of circumferentially extending endless grooves in its outer periphery spaced axially of the matrix, a pair of separate heating elements seated in the grooves, each element extending slightly more than half way about the body, and the two elements being disposed in opposed relation to each other; there being means holding the elements in the respective grooves with their adjacent ends in overlapping relation laterally of the body.

3. In a tire receiving matrix which includes a full-circle body provided with a pair of circumferentially extending endless grooves in its outer periphery spaced axially of the matrix, a pair of separate electric heating elements seated in the grooves, each element extending slightly more than half way about the body, the two elements being disposed in opposed relation to each other with their adjacent ends in overlapping relation laterally of the body, a terminal box on the body adjacent one pair of such adjacent ends, circuit wires extending from such ends to the terminal box, and other circuit wires extending to the terminal box from the opposite pair of ends of the elements and disposed mainly in the portions of the grooves not occupied by the respective elements.

4. In a tire receiving matrix which includes a full-circle body, a pair of separate heating elements mounted on and extending about the body circumferentially and from opposite sides thereof, and in spaced relation axially of the matrix, the length of each element being sufficient to extend about the body a distance slightly greater than one half the peripheral extent of the body whereby the end portions of the elements overlap each other, the elements each including a rigid cover sheath curved to conform to the contour of the body, and a dowel pin fixed on each sheath substantially centrally of its ends and projecting from the concave side thereof, the body having a radial socket in its outer periphery to receive the pin.

5. In a tire receiving matrix which includes a full-circle body, a pair of separate heating elements mounted on and extending about the body circumferentially and from opposite sides thereof, the length of each element being sufficient to embrace substantially one-half the peripheral extent of the body, the adjacent ends of the elements being spaced from each other axially of the matrix but extending in overlapping relation, said elements being electric, a terminal box on the body adjacent one pair of such adjacent ends, and circuit wires extending separately from both ends of each element to the terminal box.

References Cited in the file of this patent

UNITED STATES PATENTS

| | | | |
|---|---|---|---|
| 2,545,653 | 3/51 | Desloge | 219—535 X |
| 2,570,657 | 10/51 | Fannen | 219—243 X |
| 2,970,346 | 2/61 | Fannen | 18—38 |
| 2,987,599 | 6/61 | Voss | 219—535 |
| 3,060,508 | 10/62 | Duerksen | 18—38 |

RICHARD M. WOOD, *Primary Examiner.*